(No Model.) 2 Sheets—Sheet 1.

W. BOESE.
HARNESS TRIMMING.

No. 332,634. Patented Dec. 15, 1885.

Witnesses:
Wm. W. Edmunds
Abraham Manners

Inventor
Wm. Boese,
by his atty.
J. C. Clayton.

(No Model.) 2 Sheets—Sheet 2.
W. BOESE.
HARNESS TRIMMING.
No. 332,634. Patented Dec. 15, 1885.
Fig. 8. Fig. 9. Fig. 10.
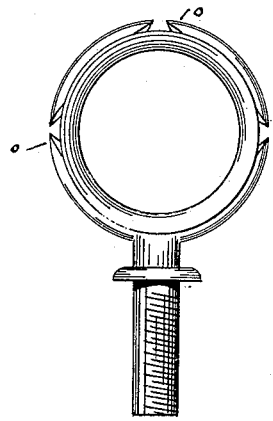
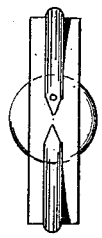
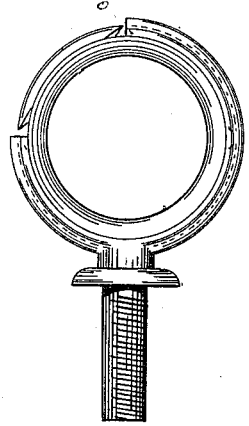
Fig. 11. Fig. 12.
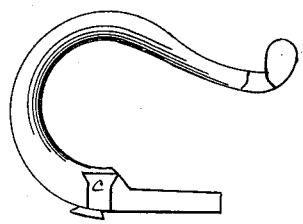
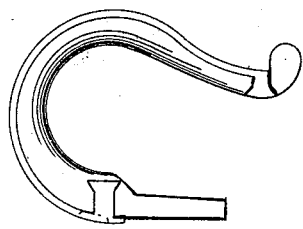
Fig. 13.
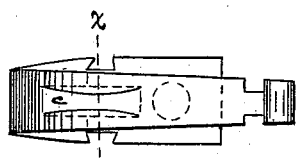
Fig. 14.
Witnesses:
Wm. M'Gurley
Abraham Manners
Inventor
Wm. Boese,
by his atty.
J. C. Clayton.

UNITED STATES PATENT OFFICE.

WILLIAM BOESE, OF NEWARK, NEW JERSEY.

HARNESS-TRIMMING.

SPECIFICATION forming part of Letters Patent No. 332,634, dated December 15, 1885.

Application filed February 10, 1885. Serial No. 155,530. (No model.)

*To all whom it may concern:*

Be it known that I, WILLIAM BOESE, a citizen of the United States, and a resident of Newark, Essex county, State of New Jersey, have invented certain new and useful Improvements in the Manufacture of Harness-Mountings, of which the following is a specification.

My invention relates to that class of harness-mountings in which the metal core or body of the article (such as rings, buckles, hooks, terrets, &c.) is coated or covered with vulcanized rubber or with celluloid or other suitable plastic composition.

This invention consists in harness-mountings partially covered with rubber or other plastic material. The blank or core is provided with perforations and with undercut or dovetail recesses, through which and into which the plastic material is forced. By this means the coating is not only made fast to the core, but I am enabled to better produce the effect of inlaying the coating, as shown in Figures 1, 2, 3, and 4.

Figure 1:
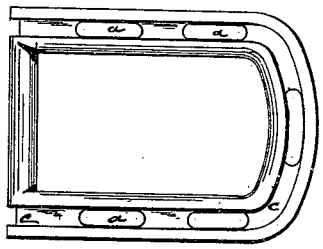
Figure 3:
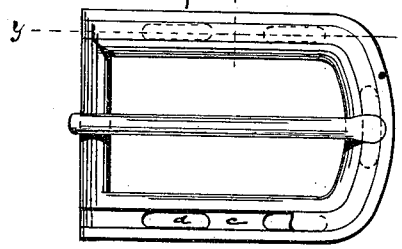
Figure 2:
Figure 4:
Figure 5:
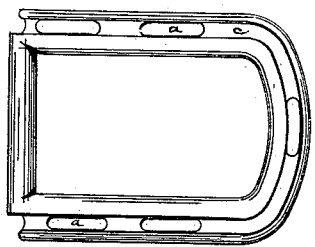
Figure 6:
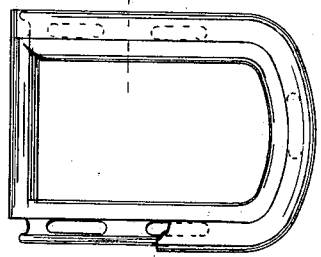
Figure 7:

In the drawings, Fig. 1 shows the metal core of a buckle with perforations $a$ and undercut grooves $c$ for receiving the composition. Fig. 2 is a section of same. Fig. 3 shows the same core with the coating applied, producing the effect of being inlaid. Fig. 4 is a section of same. Figs. 5, 6, and 7 are similar views of another style of buckle, also provided with perforations and grooves. Figs. 8, 9, and 10 are views of a terret having undercut projections $o$ on the periphery for receiving and holding the composition. Figs. 11, 12, 13, and 14 show a water-hook provided with undercut grooves $c$ for receiving and holding the composition.

Whenever I can make such a coating (see Figs. 1 to 4) as to leave a considerable portion of the core uncovered, there is large saving, as the cost of the coating is far greater than that of the core. My invention in some cases effects such a saving.

The composition is made to firmly adhere by pressure to the core, and is pressed into the perforations, cuts, and grooves, giving a better "hold" than the former mode.

I am aware of Patent No. 150,997, of 1874, which has not the undercut or dovetail feature, and in which the plastic material is held by surrounding or embracing the core. In my device it holds upon any side by being forced into an undercut recess.

I claim as my invention—

A harness-mounting having undercut grooves or other undercut or dovetail recesses and perforations through said recesses, which are filled with rubber or other plastic material forced into such recesses and hardened, whereby portions of the mountings are covered and the filling is held in place, as set forth.

In testimony that I claim the foregoing as my invention I have signed my name, in presence of two witnesses, this 9th day of February, 1885.

WILLIAM BOESE.

Witnesses:
ABRAHAM MANNERS,
WM. M. ENNETUS.